United States Patent
Voogel et al.

(10) Patent No.: US 7,504,877 B1
(45) Date of Patent: Mar. 17, 2009

(54) CHARGE PUMP AND VOLTAGE REGULATOR FOR BODY BIAS VOLTAGE

(75) Inventors: Martin L. Voogel, Los Altos, CA (US); Ly Nguyen, San Jose, CA (US)

(73) Assignee: XILINX, Inc., San Jose, CA (US)

( * ) Notice: Subject to any disclaimer, the term of this patent is extended or adjusted under 35 U.S.C. 154(b) by 82 days.

(21) Appl. No.: 11/639,546

(22) Filed: Dec. 15, 2006

(51) Int. Cl.
G05F 1/10 (2006.01)
G05F 3/02 (2006.01)

(52) U.S. Cl. .................. 327/536; 327/534; 363/59; 363/60

(58) Field of Classification Search .......... 327/534, 327/536; 363/59–60
See application file for complete search history.

(56) References Cited

U.S. PATENT DOCUMENTS

| 7,355,437 | B2 * | 4/2008 | Perisetty ............... 326/14 |
| 2005/0030771 | A1 * | 2/2005 | Conte et al. ............. 363/59 |
| 2006/0132218 | A1 * | 6/2006 | Tschanz et al. ........... 327/534 |

* cited by examiner

*Primary Examiner*—Long Nguyen
*Assistant Examiner*—Brandon S Cole
(74) *Attorney, Agent, or Firm*—W. Eric Webostad

(57) ABSTRACT

An integrated circuit including a voltage generator for generating a body bias voltage is described. The voltage generator includes a charge source and a voltage regulator coupled to the charge source. Transistors are coupled to the charge source to receive the body bias voltage from the voltage generator.

15 Claims, 10 Drawing Sheets

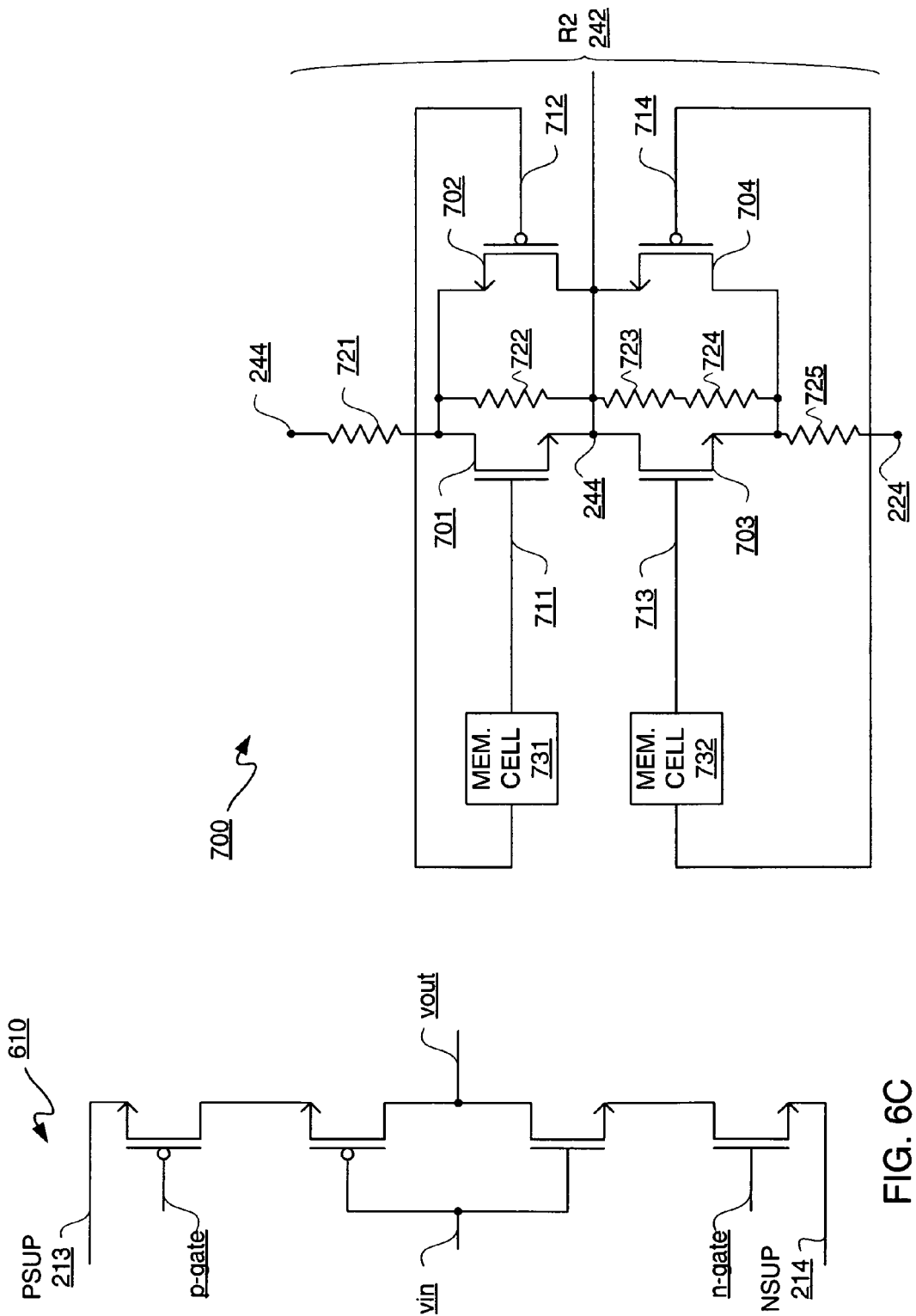

CHARGE PUMP AND VOLTAGE REGULATOR FOR BODY BIAS VOLTAGE

FIELD OF THE INVENTION

One or more aspects of the invention relate generally to integrated circuits and, more particularly, to a charge pump and voltage regulator for providing body bias voltage to transistors.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. Notably, as used herein, "include" and "including" mean including without limitation.

One such FPGA is the Xilinx Virtex™ FPGA available from Xilinx, Inc., 2100 Logic Drive, San Jose, Calif. 95124. Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable.

For purposes of clarity, FPGAs are described below though other types of PLDs may be used. FPGAs may include one or more embedded microprocessors. For example, a microprocessor may be located in an area reserved for it, generally referred to as a "processor block."

As is known, n-type or n-channel transistors, such as NMOS transistors, may be put in a saturated or conductive state responsive to application of a positive logic level voltage to a gate layer ("gate") thereof. Such n-type transistors may be put in a non-conductive state responsive to application of a negative logic level voltage, such as ground for example, to the gate. However, even with a grounded gate, n-type devices may have what is known as subthreshold voltage leakage. This leakage allows for what is known as a leakage current. Even though leakage current for an individual n-type transistor may be relatively small, the cumulative effect of leakage current for many n-type transistors may be significant. This cumulative leakage current may therefore have a significant impact on standby current, and accordingly contribute to power consumption of an FPGA. For FPGAs, there may be many circuit resources that are unused in an application, and accordingly the standby current associated with only unused circuit resources may be significant.

As n-type transistors of FPGAs become smaller, conventionally threshold voltage levels likewise become smaller. With a reduction in transistor threshold voltage levels, subthreshold voltage leakage may increase. This increase in subthreshold voltage leakage may be exponential, and accordingly the standby current associated with circuit resources of an FPGA, whether used or not used in an instantiated design, may be significantly increased with smaller threshold voltages.

As is known, a body bias voltage ("Vbb"), which may also be called back body bias voltage, reverse body bias voltage, back gate bias voltage, or back gate voltage, may be applied to a body of an n-type transistor to reduce subthreshold leakage. For use with n-type transistors, Vbb is conventionally applied as a negative voltage to a p-type transistor body. As most integrated circuits do not have an external pin for receiving an externally provided negative voltage, such integrated circuits conventionally include a negative voltage generator. However, a negative voltage generator consumes power. Thus, a target Vbb is conventionally selected such that there is a net positive reduction in consumed power; in other words, power saved by reduction in standby current is at least greater than power consumed by the negative voltage generator and associated circuitry used to provide Vbb. Use of the negative voltage generator is conventionally regulated for efficient application of Vbb. For example, if Vbb becomes too negative for an application, reliability of body-biased n-type transistors may be adversely affected.

Accordingly, it would be desirable and useful to provide means to enhance regulated provisioning of Vbb to facilitate reducing standby current while efficiently operating a negative voltage generator. Moreover, it would be desirable and useful to provide means to enhance regulated provisioning of Vpp to facilitate reducing standby current while efficiently operating a positive voltage generator for p-type transistors. Furthermore, as PLDs conventionally have not employed negative voltage generators to produce Vbb, it would be additionally desirable and useful if such means were applicable to PLDs, including FPGAs.

SUMMARY OF THE INVENTION

One or more aspects of the invention generally relate to integrated circuits and, more particularly, to a charge pump and voltage regulator for providing body bias voltage to transistors.

An aspect of the invention is an integrated circuit. A voltage generator is for generating a negative body bias voltage, the voltage generator including a charge pump and a voltage regulator coupled to the charge pump. A plurality of n-type transistors is coupled to the charge pump to receive the negative body bias voltage from the voltage generator. The charge pump includes a voltage-controlled oscillator coupled to a charge transfer circuit. The voltage-controlled oscillator includes a first and a second output port for providing a first and a second oscillating signal respectively therefrom. The voltage-controlled oscillator further includes a voltage control port. The charge transfer circuit includes an input voltage node and an output voltage node. The output voltage node is for sourcing the negative body bias voltage therefrom to provide to a plurality of body regions respectively of the plurality of n-type transistors. The charge transfer circuit further includes a first and a second charge input node, and a first and a second capacitive device. The first charge input node is coupled to the first output port of the voltage-controlled oscillator to receive the first oscillating signal therefrom. The first charge input node is coupled to the first capacitive device, where the first capacitive device receives the first oscillating signal. The second charge input node is coupled to the second output port of the voltage-controlled oscillator to receive the second oscillating signal therefrom. The second charge input node is coupled to the second capacitive device, where the second capacitive device receives the second oscillating signal. The first and the second oscillating signal are out of phase with respect to one another. The charge transfer circuit is configured to transfer charge to the output voltage node from the first and the second capacitive device responsive to the first and the second oscillating signal, respectively. The voltage regulator includes a voltage divider circuit and an operational amplifier. The voltage divider circuit is coupled to the output voltage node to receive the negative body bias voltage and is configured to provide a nodal voltage responsive to the negative body bias voltage as an input to the operational amplifier. The operational amplifier is coupled to receive the nodal voltage and a first reference voltage and is configured to provide a control voltage responsive to a difference between the nodal voltage and the first reference voltage, where the control voltage is an analog of the difference.

An aspect of the invention is an integrated circuit, including: a voltage generator for generating a Vpp voltage; a voltage regulator of the voltage generator for providing a control voltage; a variable charge source of the voltage generator coupled to receive the control voltage and configured to provide charge responsive to the control voltage for providing the Vpp voltage; and the voltage generator coupled to provide the Vpp voltage to body regions associated with p-type transistors of a load; wherein the integrated circuit is a programmable logic device.

Another aspect of the invention is an integrated circuit, including: a voltage generator for generating a Vbb voltage; a voltage regulator of the voltage generator for providing a control voltage; a variable charge source of the voltage generator coupled to receive the control voltage and configured to provide charge responsive to the control voltage for providing the Vbb voltage; and the voltage generator coupled to provide the Vbb voltage to body regions associated with n-type transistors of a load; wherein the integrated circuit is a programmable logic device.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIG. 6C is a circuit diagram depicting an exemplary embodiment of an inverter.

FIG. 7 is a block/circuit diagram depicting an exemplary embodiment of a programmable resistive load.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
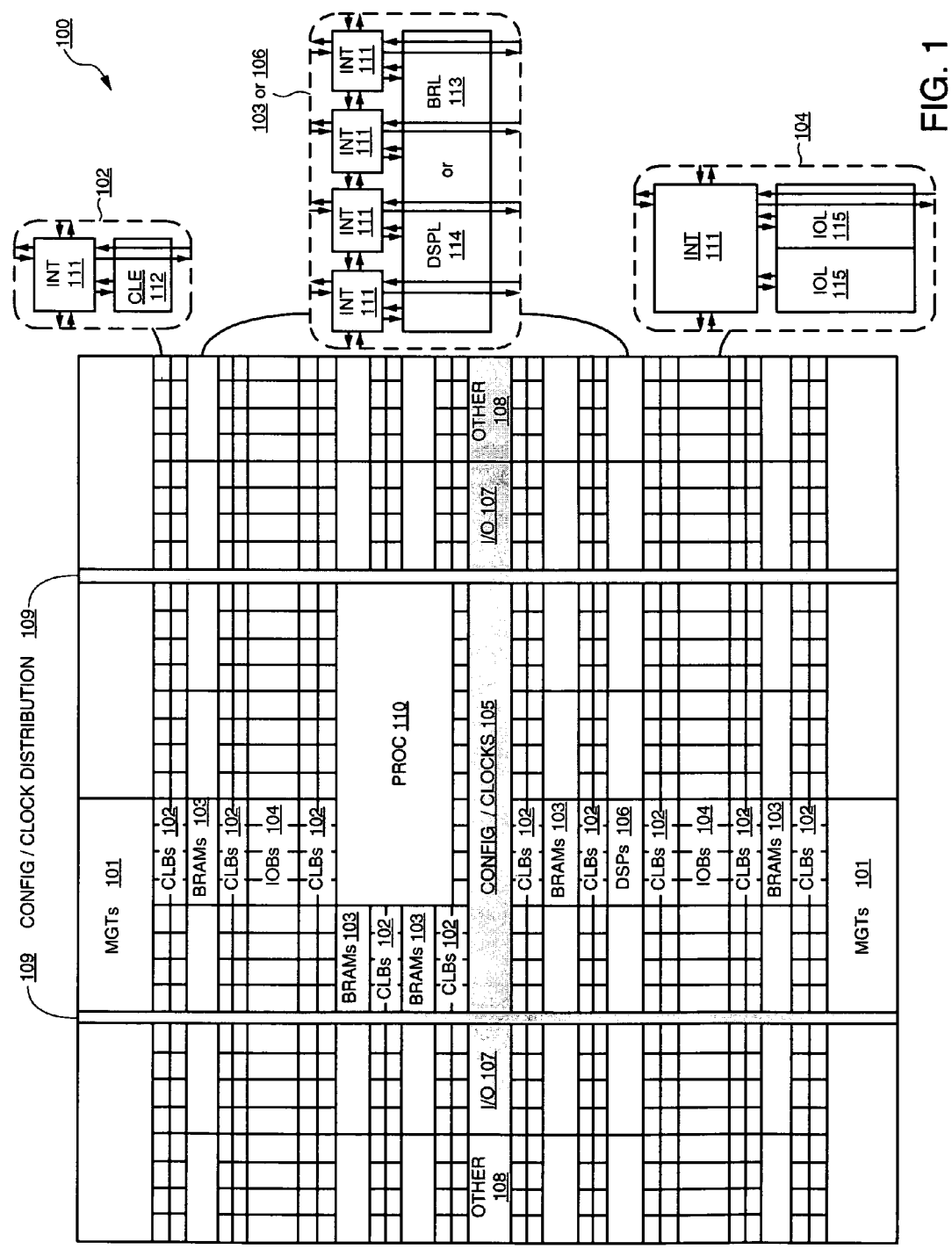
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex-4 FPGA from Xilinx of San Jose, Calif.

Figure 2A:
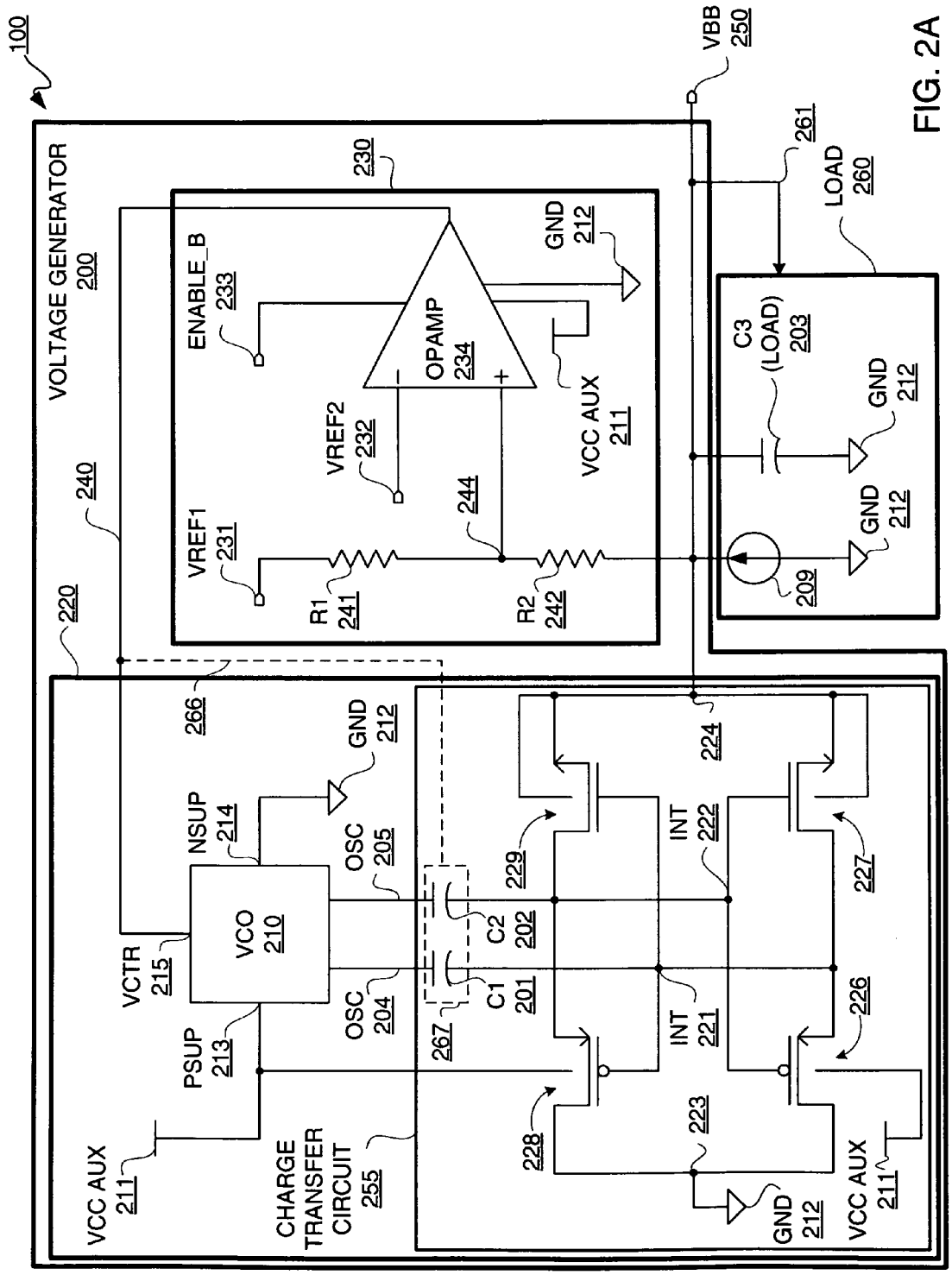
FIG. 2A is a block/circuit diagram depicting an exemplary embodiment of a voltage generator for n-type transistors of an integrated circuit, such as the FPGA of FIG. 1.

FIG. 2A is a block/circuit diagram depicting an exemplary embodiment of a voltage generator 200 of an integrated circuit, such as FPGA 100. Voltage generator 200 is for generating a negative back body bias ("Vbb") 250 for providing to body regions of n-type transistors. As is known, leakage current, and standby current, may be reduced by application of Vbb.

Voltage generator 200 includes charge pump 220 and voltage regulator 230. Voltage regulator 230 and charge pump 220 may have a common node 224 from which Vbb 250 may be sourced from charge pump 220. Load 260 coupled to common node 224 is to indicate a load associated with n-channel devices for which Vbb 250 is applied to respective body regions thereof, as generally indicated by feedback path 261 to load 260 from node 224. Load 260, or more particularly n-type transistors, may be modeled as having a capacitive load ("C3") 203 coupled between node 224 and ground 212, as well as a current source 209 coupled between node 224 and ground 212. Current source 209 is to indicate substrate leakage current of n-type transistors, which is dominated by gate-induced drain leakage ("GIDL") current and may vary, as is known, due to variations in operating temperatures, semiconductor processing, and operating voltages, among other known variables. Accordingly, current source 209 may also be termed "leakage current 209."

Notably, it should be appreciated that charge pump 220 and voltage regulator 230 are coupled in a closed feedback loop. Charge pump 220 drives load 260 as Vbb 250 is sourced from node 224, and Vbb 250 is fed forward to voltage regulator 230. Responsive to Vbb 250, voltage regulator 230 generates a control voltage 240. Control voltage 240 controls frequency of oscillating signals 204 and 205 generated by voltage-controlled oscillator ("VCO") 210 of charge pump 220 because control voltage 240 is provided to a voltage control port 215 of VCO 210.

Charge pump 220 includes VCO 210 and charge transfer circuit 255. VCO 210 is coupled to a supply voltage, such as Vcc auxiliary 211 in this example, at a positive supply port 213 of VCO 210. Notably, Vcc auxiliary 211 is used as an example for an FPGA implementation; however, other known supply voltages may be used. A negative supply port 214 of VCO 210 is coupled to ground 212. VCO 210 generates oscillating signals 204 and 205 which are out of phase with respect to one another. In this example, oscillating signals 204 and 205 are 180 degrees out of phase with respect to one another. However, oscillating signals 204 and 205 do not have to be exactly 180 degrees out of phase with respect to one another. Oscillating signals 204 and 205 may be approximately 180 degrees out of phase with one another, including being exactly 180 degrees out of phase with respect to one another.

Notably, for purposes of clarity by way of example and not limitation, Vbb 250 is regulated using a reference voltage, which in this example is a Vcc supply voltage. In short, with using Vcc, frequency of oscillating signals 204 and 205 is varied responsive to load 260. However, rather than varying frequency of oscillating signals 204 and 205, Vbb 250 may be regulated by using amplitude of oscillating signals 204 and 205 as varied responsive to load 260. Thus, for example VCO 210 may be configured to vary amplitude of oscillating signals 204 and 205 responsive to control voltage 240. Furthermore, a combination of varying amplitude and frequency of oscillating signals 204 and 205 responsive to load 260 may be used by configuring VCO 210 accordingly. Alternatively or additionally, Vbb 250 may be regulated by using variable capacitive loads for C1 and C2 responsive to control voltage 240, as generally indicated by dashed box 267 and dashed path 266, which capacitances are varied responsive to load 260. Additionally or alternatively, VCO 210 may be configured for stopping and starting of oscillating signals 204 and 205 varied responsive to load 260 as indicated by control signal 240 for regulating Vbb 250. Accordingly, there are multiple ways to vary charge transfer responsive to control voltage 240, which may or may not be used in combination with one another.

Furthermore, even though only one stage of charge transfer is described, it should be appreciated that more than one stage may be used. For example, two charge transfers can be cascaded in series such that port 224 of the first is coupled to the port 223 of the second. However, for purposes of reducing circuit resource overhead and thus reducing power consumption of charge pump 220, as well as having sufficient stability in operation of charge pump 220, one stage charge transfer and two out of phase oscillating signals 204 and 205 may be used.

Oscillating signals 204 and 205 are provided to respective capacitive devices, such as capacitor ("C1") 201 and capacitor ("C2") 202, of charge transfer circuit 255. Charge transfer circuit 255 includes capacitors 201 and 202, p-type transistors 228 and 226, and n-type transistors 229 and 227. P-type transistors 228 and 226 act as drivers, and n-type transistors 227 and 229 act as serial switches, in operation of charge transfer circuit 255, as described below in additional detail. Charge transfer circuit 255 responsive to oscillating signals 204 and 205 may be thought of as having at least two states, as described below in additional detail.

Capacitors 201 and 202 are coupled to respective interim nodes 221 and 222 of charge transfer circuit 255. Interim node 222 may be generally characterized as a negative of interim node 221. Interim node 221 is coupled to gate electrodes of p-type transistor 228 and n-type transistor 229, and is coupled to a p-type region of p-type transistor 226 and an n-type region of n-type transistor 227, where the n-type region of n-type transistor 227 and the p-type region of transistor 226 are coupled in series. Another p-type region of p-type transistor 226 is coupled to an input voltage node 223 of charge transfer circuit 225, and this input voltage node 223 may be coupled to ground 212. Another n-type region of n-type transistor 227 is coupled to common node 224, which as previously described is a source node for Vbb 250 and may also be termed output voltage node 224. Interim node 222 is coupled to gate electrodes of p-type transistor 226 and n-type transistor 227, as well as coupled between a p-type region of p-type transistor 228 and an n-type region of n-type transistor 229, which are coupled in series.

Thus, it should be appreciated that responsive to oscillating signal 204, capacitor 201 will periodically charge and discharge, and responsive to oscillating signal 205, capacitor 202 will periodically charge and discharge. Continuing the example of oscillating signals 204 and 205 being approximately 180 degrees out of phase with respect to one another, capacitors 201 and 202 may operate in a generally opposing pattern; in other words, when capacitor 201 is charging, capacitor 202 is discharging, and vice versa. During the discharging phase of capacitor 201, charge is applied to interim node 221, and during the discharging phase of capacitor 202 charge is applied to interim node 222.

Continuing the description of charge transfer circuit 255, another p-type region of p-type transistor 228 is coupled to input voltage node 223, and another n-type region of n-type transistor 229 is coupled to output voltage node 224. Body regions of p-type transistors 228 and 226 may be coupled to a supply voltage such as Vcc auxiliary 211. Moreover, n-type transistors 227 and 229 may have their body regions coupled to node 224 to receive Vbb 250.

For a half cycle, where oscillating signal 204 is at a logic high voltage level and oscillating signal 205 is at logic low level, such as Vcc auxiliary 211 and ground 212 respectively, capacitor 201 will charge and capacitor 202 will discharge. Furthermore, n-type transistor 227 is switched to an off state and p-type transistor 226 is switched to an on state by application of a logic low voltage to interim node 222. Inversely, application of a logic high voltage to interim node 221 causes n-type transistor 229 to be switched to an on state and causes p-type transistor 228 to be switched to an off state. For n-type transistor 229 in an on state, discharge of charge, which is of a negative potential, from capacitor 202 is coupled to node 224 to provide a negative bias voltage. For p-type transistor 226 in an on state, capacitor 201 is charged to an input voltage as it is effectively coupled to ground 212 through a channel of p-type transistor 226.

In a half cycle where oscillating signal 204 is at a logic low voltage level and oscillating signal 205 is at a logic high voltage level, the above description may be used though in the reverse, where p-type transistor 228 and n-type transistor 227 are switched to an on state and p-type transistor 226 and n-type transistor 229 are switched to an off state. Furthermore, in this half cycle, capacitor 201 discharges and capacitor 202 is charged.

If there is no load 260, output voltage Vbb 250 sourced from node 224 is equal to the input voltage sourced from node 223 minus the supply voltage, which for this example would in effect mean that Vbb 250 was equal to negative Vcc auxiliary 211. However, for load 260, Vbb 250, namely the output voltage of node 224, is equal to the output resistance times the leakage current 209 of load 260 minus the supply voltage times the capacitive load 203 over the total capacitance of load 260. The total capacitance of load 260 may be thought of as the capacitive load 203 plus parasitic capacitance associated with load 260. A mathematical equation for this relationship may be expressed as:

$$V_{out} = R_{out} I_{load} - \frac{V_{ccaux} C_{load}}{(C_{load} + C_{par})}, \quad (1)$$

where $C_{par}$ is parasitic capacitance associated with n-type transistors, $C_{load}$ is C3, $I_{load}$ is leakage current 209, and $R_{out}$ is an output resistance of n-type transistors. It should be appreciated that for a regulated charge pump, charge pump output voltage may be set to a desired level, subject to limited fluctuations.

Accordingly, it should be appreciated that capacitive load 203 is sufficiently large to ensure that an NMOS junction of n-type transistors is reverse biased. Furthermore, it should be appreciated that the term "body regions" as used herein may refer to a substrate or to a well formed in a substrate. For example, n-type transistors may be formed using a p-type wafer, where n-type and p-type wells are formed as part of what is known as a triple well process for forming n-well isolated p-type body regions for n-type transistors. Thus, the term "body" as used herein may refer to a substrate or a well. Furthermore, a substrate may be a bulk wafer, an epitaxial layer, or a silicon layer disposed on an insulator as in silicon-on-insulator ("SOI"), as is known. For purposes of clarity and not limitation, it shall be assumed that a triple well process is used where a p-well is formed in an n-well and both of which are formed in a p-type substrate, and that such p-well may be coupled to common node 224 for receiving Vbb 250 to back body biasing of n-type transistors associated therewith.

Vbb 250 sourced from common node 224 is regulated by voltage regulator 230. Voltage regulator 230 includes an operational amplifier ("OPAMP") 234 and voltage divider circuit formed of resistive loads R1 and R2, namely for example respective discrete resistors 241 and 242 as described below in additional detail. By regulating the frequency of oscillator signals 204 and 205 with voltage regulator 230 responsive to Vbb 250, it should be appreciated that the amount of charge pumped to load 260 is affected. For example, when load 260 draws more current from Vbb 250, VCO 210 will increase the frequency of oscillating signals 204 and 205. However, when load 260 draws less current from Vbb 250, VCO 210 will correspondingly decrease the frequency of oscillating signals 204 and 205.

As leakage current 209 increases, Vbb 250 becomes more positive and accordingly frequency of oscillating signals 204 and 205 is increased to pump more negative charge to node 224 to bring Vbb back to being more negative. However, if substrate leakage current 209 decreases, Vbb 250 becomes more negative, and thus frequency of oscillating signals 204 and 205 is decreased to pump less negative charge to node 224 to allow Vbb 250 to move or drift toward a more positive voltage. With respect to reducing frequency of oscillating signals 204 and 205, it should be appreciated that power is conserved by not over-pumping charge with charge pump 220. Furthermore, it should be appreciated that the overall power efficiency is enhanced by use of voltage regulator 230.

Resistive load R2 may be provided using a programmable resistance to adjust a nodal voltage or input operational amplifier voltage $V_N$, as $V_N$ may have a different set point for differing applications. For purposes of clarity by way of example, resistive loads R1 and R2 are described as respective discrete resistors 241 and 242 coupled in series with node 224 located between such series coupling. Resistor 241 is coupled in series between a reference voltage ("$V_{ref1}$") 231 and node 244, and resistor 242 is coupled in series between node 224 and node 244. With respect to operation of voltage regulator 230, total voltage at node 244 for the voltage divider provided by R1 and R2 may be mathematically expressed as:

$$V_N = \frac{R2(V_{ref1} - Vbb)}{R1 + R2} + Vbb \quad (2)$$

Node 244 is coupled to a positive input terminal of OPAMP 234. A negative input terminal of OPAMP 234 is coupled to another reference voltage ("$V_{ref2}$") 232. Reference voltage 232 may be set lower than reference voltage 231. For purposes of clarity by way of example and not limitation, it shall be assumed that a target voltage for Vbb 250 is approximately −1 volt and reference voltages 231 and 232 respectively are approximately 1.2 volts and 0.8 volts. Furthermore, OPAMP 234 may be powered using Vcc auxiliary 211, which for example may be approximately 2.5 volts, and may be coupled to ground 212. Furthermore, OPAMP 234 may be activated using a complement of an enable signal, namely enable bar signal 233. Output of OPAMP 234 is an analog of the difference between nodal voltage $V_N$ at node 244 and reference voltage 232, namely control voltage 240. As described above, control voltage 240 is provided to voltage control port 215 of VCO 210.

By coupling a body region to a drain region for each of n-type transistors 227 and 229, forward biasing of the drain to body junction may be avoided as both regions are at the same potential, namely Vbb 250 in this example. Likewise, body regions for each of p-type transistors 228 and 226 are coupled to Vcc auxiliary so that forward biasing of the drain to body junction may be avoided.

In this example, the voltage divider provided by resistors 241 and 242 is to produce a positive voltage at node 224. So as Vbb 250 changes, nodal voltage $V_N$ at node 244 changes responsively; however, this change is manifested as a positive voltage at node 244 for input to OPAMP 234. As Vbb 250 becomes less negative, nodal voltage $V_N$ at node 244 correspondingly becomes more positive. As Vbb 250 becomes more negative, nodal voltage $V_N$ at node 244 correspondingly becomes less positive. As nodal voltage $V_N$ at node 244 increases, the difference between nodal voltage $V_N$ applied to a positive terminal of OPAMP 234 and reference voltage 232 applied to a negative terminal of OPAMP 234 increases. Accordingly, the analog output of this increase in difference between nodal voltage $V_N$ at node 244 and reference voltage 232 effectively is a higher control voltage 240 provided to voltage control port 215 of VCO 210. A higher control voltage 240 means that frequency of oscillating signals 204 and 205 is increased, and thus more charge is pumped from charge pump 220 to bring Vbb 250 to a more negative voltage. Contrastingly, as nodal voltage $V_N$ at node 244 becomes less positive the difference between reference voltage 232 subtracted from such nodal voltage $V_N$ at node 244 responsively decreases, and thus the analog output control voltage 240 from OPAMP 234 decreases. As control voltage 240 output from OPAMP 234 decreases, frequency of oscillating signals 204 and 205 is decreased which causes less charge to be pumped from charge pump 220 allowing Vbb 250 to become more positive.

Figure 2B:
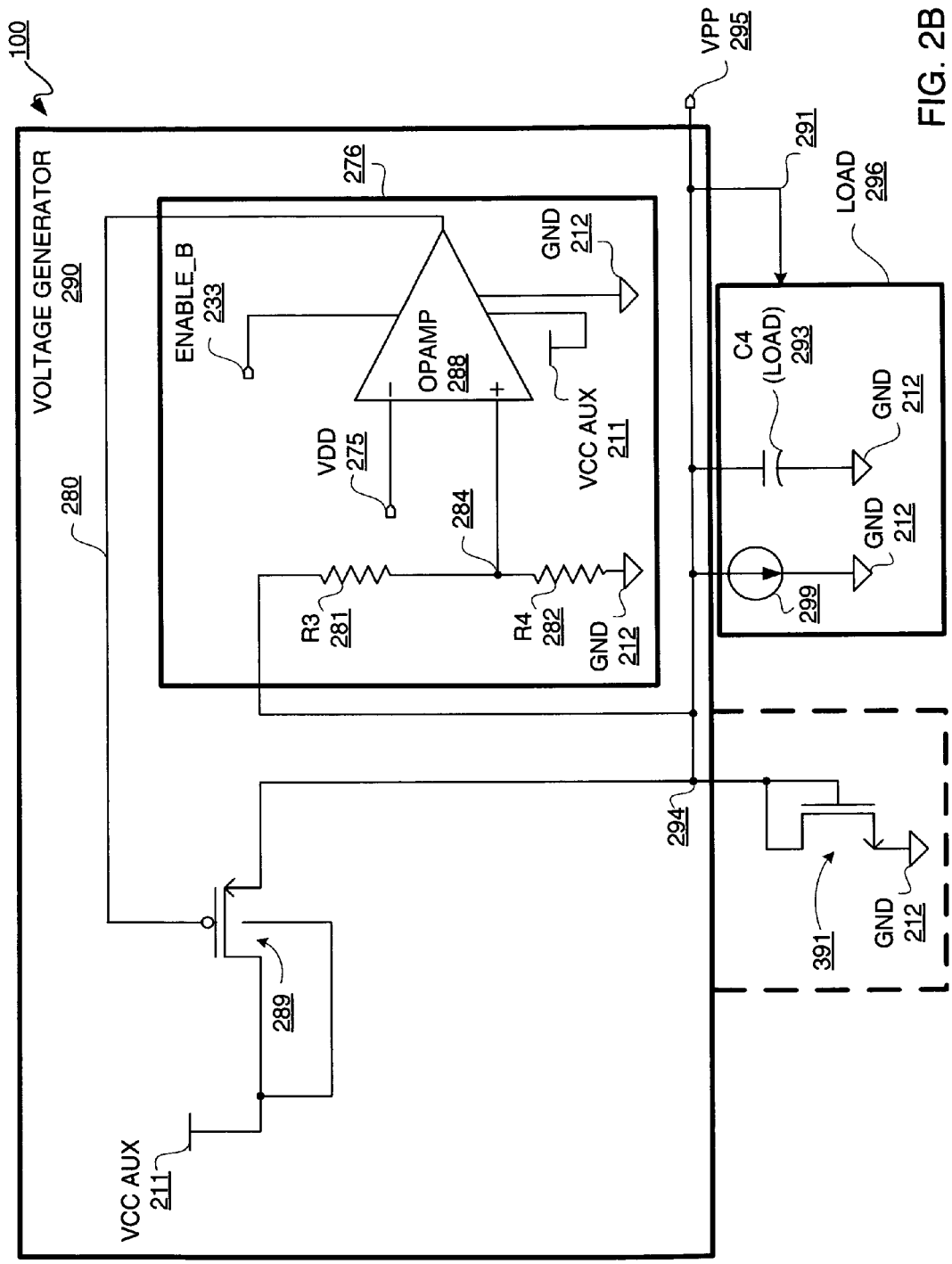
FIG. 2B is a block/circuit diagram depicting an exemplary embodiment of a voltage generator for p-type transistors of an integrated circuit, such as the FPGA of FIG. 1.

FIG. 2B is a block/circuit diagram depicting an exemplary embodiment of a voltage generator 290 of an integrated circuit, such as FPGA 100. Voltage generator 290 is for generating a positive back body bias ("Vpp") 295 for providing to body regions of p-type transistors, as generally indicated by feedback path 291 to load 296. As is known, leakage current, and standby current, may be reduced by application of Vpp.

Voltage generator 290 includes driver 289 and voltage regulator 276. Driver 289 may be implemented using a p-type transistor, as illustratively shown in FIG. 2B. Voltage regulator 276 and driver 289 may have a common node 294 from which Vpp 295 may be sourced from a drain region of driver 289. A body region and a source region of driver 289 may be coupled to VCC 211.

Load 296 coupled to common node 294 is to indicate a load associated with p-channel devices for which Vpp 295 is applied to respective body regions thereof, as generally indicated by feedback path 291 to load 296 from node 294. Load 296, or more particularly p-type transistors, may be modeled as having a capacitive load ("C4") 293 coupled between node 294 and ground 212, as well as a current source 299 coupled between node 294 and ground 212.

Current source 299 is to indicate the substrate leakage current of p-type transistors, which is dominated by GIDL current and may vary, as is known, due to variations in operating temperatures, semiconductor processing, and operating voltages, among other known variables. Accordingly, current source 299 may also be termed "leakage current 299."

Notably, it should be appreciated that driver 289 and voltage regulator 276 are coupled in a closed feedback loop. Driver 289 drives load 296 as Vpp 295 is sourced from node 294, and Vpp 295 is fed forward to voltage regulator 276. Responsive to Vpp 295, voltage regulator 276 generates a control voltage 280. Control voltage 280 is provided to a gate of driver 289. Thus, driver 289 may be operated to responsively pass current to node 294 to adjust the voltage thereof.

Vpp 295 sourced from common node 294 is regulated by voltage regulator 276. Voltage regulator 276 includes an OPAMP 288 and a voltage divider circuit formed of resistive loads R3 and R4, namely for example respective discrete resistors 281 and 282. Notably, one or more of R3 and R4 may be programmable resistances, as described below in additional detail with reference to R2.

For example, when load 296 draws less current from Vpp 295, control voltage 280, which is an analog of the difference between Vdd 275 input to a minus port of OPAMP 288 and nodal voltage $V_N$ of node 284, goes toward a positive voltage level. A more positive control voltage 280 causes driver 289 to be less conductive between Vcc 211 and node 294. However, when load 296 draws more current from Vpp 295, control voltage 280 goes toward a logic low voltage level. A less positive control voltage 280 causes driver 289 to be more conductive between Vcc 211 and node 294.

Resistive load R4 may be provided using a programmable resistance to adjust a nodal voltage or input operational amplifier voltage $V_N$, as $V_N$ may have a different set point for differing applications. For purposes of clarity by way of example, resistive loads R3 and R4 are described as respective discrete resistors 281 and 282 coupled in series with node 284 located between such series coupling. Resistor 281 is coupled in series between nodes 294 and 284, and resistor 282 is coupled in series between node 284 and ground 212. With respect to operation of voltage regulator 276, Vpp at node 295 for the voltage divider provided by R3 and R4 may be mathematically expressed as:

$$V_{pp} = \frac{(R3 + R4)Vdd}{R4}. \tag{3}$$

Node 284 is coupled to a positive input terminal of OPAMP 288. A negative input terminal of OPAMP 234 is coupled to Vdd 275. Reference voltage Vdd 275 may be set lower than Vpp. For purposes of clarity by way of example and not limitation, it shall be assumed that a target voltage for Vpp 295 is approximately 1.6 volts and Vdd is approximately 1.0 volt. Furthermore, OPAMP 288 may be powered using Vcc auxiliary 211, which for example may be approximately 2.5 volts, and may be coupled to ground 212. Furthermore, OPAMP 288 may be activated using a complement of an enable signal, namely enable bar signal 233.

Optionally, voltage generator 290 may include an n-type transistor 391 configured as a "leaker," namely a transistor used to vary leakage current associated with leakage current 299. Transistor 301 may have its gate and source region coupled to node 294, and have its drain region coupled to ground 212.

For FPGA 100, voltage regulator 276 may be located as a single instance in a center column for regulating multiple instances of drivers 289 and associated "leakers" 391. Each driver 289 and leaker 391 pair may be respectively located in a clock row, such as an H-clock row of FPGA 100.

Notably, for purposes of clarity, n-type voltage generators generally associated with voltage generator 200 of FIG. 2A are described below, as operation of and variations to p-type voltage generator 290 may be understood from the following description.

Figure 3:
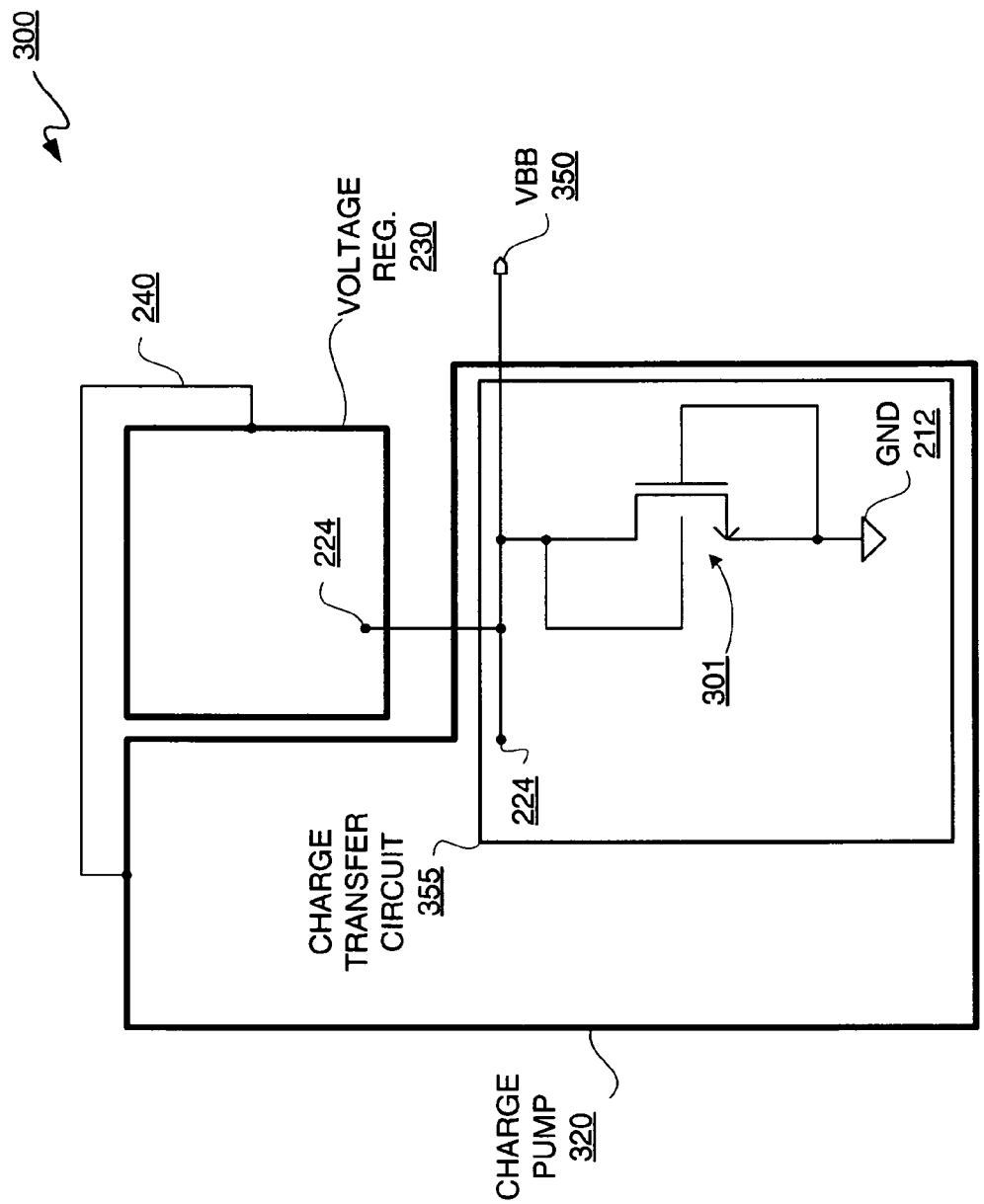
FIGS. 3, 4, and 5 are block/circuit diagrams depicting three respective alternative exemplary embodiments of a voltage generator for n-type transistors of an integrated circuit, such as the FPGA of FIG. 1.

FIG. 3 is a block/circuit diagram depicting an exemplary embodiment of voltage generator 300, which is similar to voltage generator 200 of FIG. 2A except with the addition of an n-type transistor 301 coupled to node 224. Voltage generator 300 may be used to reduce Vbb overshoot, reduce settling time of Vbb, and to provide a more stable Vbb 350 by reducing variation in current load. Notably, "Vbb overshoot" means missing a target level for Vbb whether being to negative or too positive. Charge transfer circuit 355 is charge transfer circuit 255 of FIG. 2A, but with the addition of "leaky" n-type transistor 301 ("leaker"). Likewise, charge pump 320 is charge pump 220 of FIG. 2 just replacing charge transfer circuit 255 with charge transfer circuit 355. With simultaneous reference to FIGS. 2 and 3, voltage generator 300 is further described.

It should be appreciated that leakage current 209 may vary over a wide range due to variations in operating temperature, number of circuit resources employed for a design instantiated in an FPGA, and process variations, among other known factors impacting substrate current leakage. Thus for example, leakage current 209 may vary from approximately one microampere to approximately one milliampere. The addition of a "leaky" n-type transistor 301 may be used to increase overall current leakage.

In this example, n-type transistor 301 has its gate and drain coupled to ground 212. Furthermore, a body region and a source region of n-type transistor 301 are coupled to node 224 to receive Vbb 350. If, for example, leakage current through n-type transistor 301 from drain to source is known to be approximately 0.5 milliamperes, then the overall leakage is approximately 0.5 milliamperes to 1.5 milliamperes. It should be appreciated that one microampere is orders of magnitude smaller than one milliamperes. Adding 0.5 milliamperes raises the minimum leakage current of the n-type transistors within one order of magnitude of a maximum leakage current of 1.5 milliamperes for this example. By having the minimum leakage current within an order of magnitude of the maximum leakage current, a more stable Vbb 350 may be produced.

Accordingly, it should be appreciated that the addition of leaker n-type transistor 301, which is effectively a diode-connected transistor, limits variation of standby current load associated with leakage current 209. Hence, adding transistor 301 is to enhance response time of voltage regulator 230 in reducing Vbb 350 overshoot and settling time for start up of charge pump 320 with charge transfer circuit 355.

Figure 4:
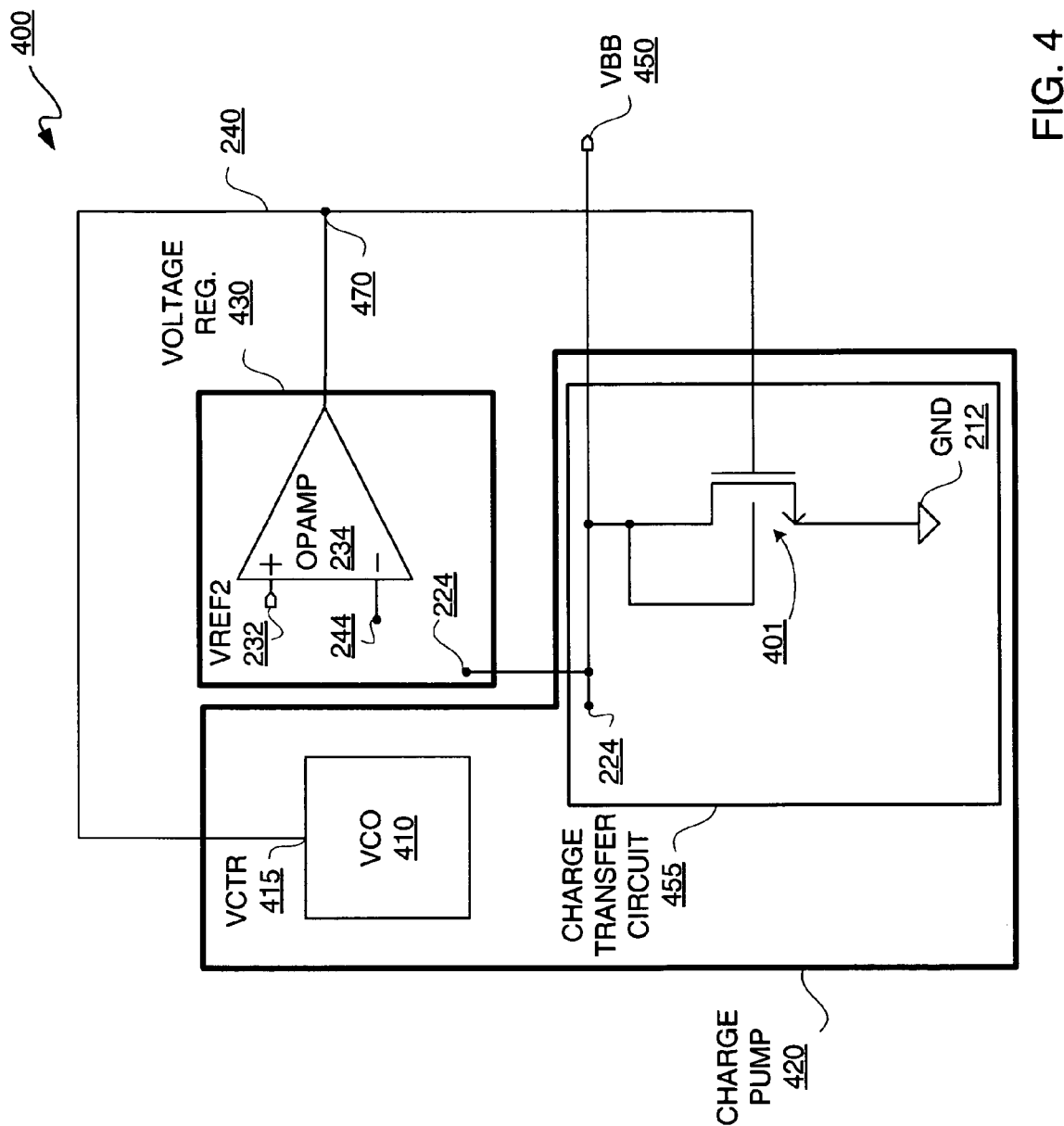

FIG. 4 is a block/circuit diagram depicting an exemplary embodiment of a voltage generator 400. Voltage generator 400 is similar to voltage generators 200 and 300 respectively of FIGS. 2 and 3, and accordingly only the differences between them are described. Charge transfer circuit 455 is the same as charge transfer circuit 355 of FIG. 3, except that n-type transistor 301 of FIG. 3 is replaced with n-type transistor 401. With simultaneous reference to FIGS. 2, 3, and 4, voltage generator 300 is further described. N-type transistor 401 has its gate coupled to receive control voltage 240 as sourced from node 470. Charge pump 420, in addition to including charge transfer circuit 455, includes VCO 410. VCO 410 is similar to VCO 210 of FIG. 2A, except that a voltage control port 415 is used. In effect, voltage control port 415 of VCO 410 is of an opposite polarity than that of voltage control port 215 of FIG. 2A. Alternatively stated, VCO 410 is the same as VCO 210 of FIG. 2A, except that it is wired to receive control voltage 240 to a negative port, namely voltage control port 415. This internal wiring difference between VCOs 210 and 410 is described in additional detail with reference to FIGS. 7A and 7B, respectively.

Voltage regulator 430 is the same as voltage regulator 230 of FIGS. 2 and 3, except that voltage reference 232 is provided as a positive input of OPAMP 234 and nodal voltage $V_N$ at node 244 is coupled to a minus port of OPAMP 234. Thus, it should be appreciated that as Vbb 450 becomes more positive, nodal voltage $V_N$ at node 244 likewise becomes more positive, meaning that the subtraction of nodal voltage from reference voltage produces a smaller, and not a larger, value in contrast to voltage regulator 230 of FIGS. 2 and 3. Accordingly, as Vbb 450 becomes more positive, control voltage 240 decreases. Furthermore, as Vbb 450 becomes more negative, control voltage 240 increases. By providing control voltage to a negative voltage control port 415 of VCO 410, negative logic is used in comparison with logic described with reference to FIG. 2A. In other words, as control voltage 240 increases, frequency of oscillating signals 204 and 205 decreases. Moreover, as control voltage 240 applied to voltage control port 415 decreases, frequency of oscillating signals 204 and 205 increases.

As described above, n-type transistor 301 of FIG. 3 was coupled as a diode-connected transistor to provide a substantially fixed subthreshold voltage leakage current 209, which in the example was approximately 0.5 milliamperes. By providing control voltage 240 to a gate electrode of n-type transistor 401 of FIG. 4, n-type transistor 401 provides a variable leakage current.

In accordance with the above description, as Vbb 450 becomes more positive, control voltage 240 decreases. For a smaller control voltage 240, leakage current through n-type transistor 401 decreases. Notably, as substrate leakage current increases, Vbb 450 becomes less negative. Therefore, decreasing leakage current through leaker n-type transistor 401 facilitates bringing Vbb 450 back more negative in voltage. Moreover, VCO 410 for a smaller control voltage 240 applied to voltage control port 415 increases frequency of oscillating signals 204 and 205, which further facilitates bringing Vbb 450 more negative. In other words, n-type transistor 401 is used by charge pump 420 in bringing Vbb 450 more negative in comparison to having a fixed leakage current, as was described with reference to FIG. 3.

For Vbb 450 becoming more negative in voltage, control voltage 240 becomes larger. A larger control voltage 240 as applied to voltage control port 415 causes VCO 410 to reduce frequency of oscillating signals 204 and 205. Accordingly, charge pump 420 provides a decreasing amount of charge to node 224 which causes Vbb 450 to become more positive.

Moreover, for a larger control voltage 240 applied to a gate electrode of n-type transistor 401, more current passes through the channel of n-type transistor 401. By having an increase in current load provided by current load through n-type transistor 401, such an increase in current load facilitates bringing Vbb 450 more positive. In other words, charge pump 420 is aided by the addition of n-type transistor 401 for bringing Vbb 450 more positive.

Thus, a variable leakage as provided via n-type transistor 401 may be used to assist charge pump 420 in maintaining Vbb 450 at a target level. Moreover, use of n-type transistor 401 as a variable leakage source may improve overshoot and settling time of Vbb 450. To enhance the range of variability of leakage current of n-type transistor 401, n-type transistor 401 may be sized to be smaller than n-type transistor 301 of FIG. 3. For example, n-type transistor 401 may have a channel width approximately one-eighth the channel width of n-type transistor 301 of FIG. 3. Furthermore, the channel length as between n-type transistors 301 and 401 may be the same. Notably, FIGS. 3 and 4 are not to any scale as illustratively shown.

Figure 5:
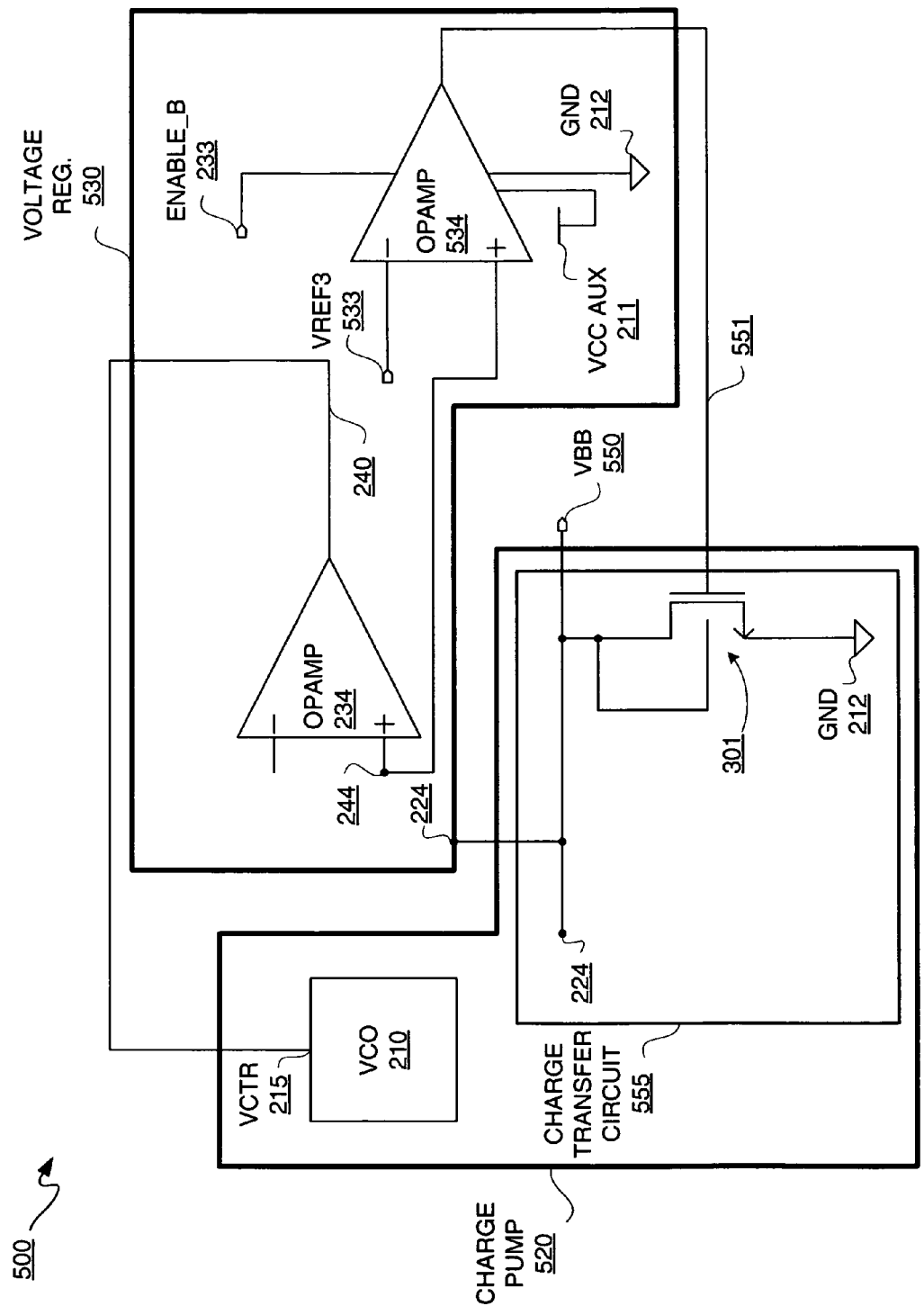

FIG. 5 is a block/circuit diagram depicting an exemplary embodiment of a voltage generator 500. Voltage generator 500 is similar to voltage generator 300 of FIG. 3, except n-type transistor 301 is gated from the output of an OPAMP 534 added to a voltage regulator 230 to provide voltage regulator 530. As voltage generator 500 is similar to voltage generator 300 of FIG. 3, only the differences are described for purposes of clarity. With simultaneous reference to FIGS. 2, 3, and 5, voltage generator 500 is further described.

Whereas output of OPAMP 234 is analog, output of OPAMP 534 is binary. In other words, OPAMP 534 is configured to operate as a comparator producing an output of a logic 1 or a logic 0 voltage. A positive input port of OPAMP 534 of voltage regulator 530 is coupled to receive nodal voltage $V_N$ at node 244. A negative input port of OPAMP 534 is coupled to receive a reference voltage ($V_{ref3}$) 533. The remainder of OPAMP 534 may be coupled to enable bar signal 233, Vcc auxiliary 211, and ground 212 as is OPAMP 234.

For nodal voltage $V_N$ sourced from node 244 and provided to OPAMP 534 being less in magnitude than reference voltage 533, output of OPAMP 534 is a logic high voltage level. Continuing the above example, this logic high voltage level may be approximately 2.5 volts. Output of OPAMP 534, namely control voltage 551, is provided to a gate electrode of n-type transistor 301.

For a logic high voltage level applied to a gate electrode of n-type transistor 301, such transistor 301 is turned to a substantially on state, namely turned on "hard." Notably, with zero voltage applied at the gate, transistor 301 may be in a "weakly-on" state, as described below in additional detail. Accordingly, if the magnitude of nodal voltage $V_N$ is less than the magnitude of reference voltage 533, this may mean that Vbb 550 is becoming more negative. To cause Vbb 550, which is becoming more negative, to become more positive, transistor 301 is switched to an on state which couples node 224 to ground 212. As ground 212 is at a higher voltage level, namely 0 volts, than a negative and decreasing voltage Vbb 550, Vbb 550 is pulled up to become more positive. Stated another way, as current load is increased by switching transistor 301 to an on state, Vbb 550 is aided in becoming more positive. Thus, charge pump 520 having charge transfer circuit 555 is assisted by switching transistor 301 to an on state for the purposes of pulling Vbb 550 up.

Conversely, if magnitude of nodal voltage $V_N$ at node 244 is greater than reference voltage 533, output of OPAMP 534 is a logic low voltage level, which in this example is ground or zero volts. In other words, magnitude of nodal voltage $V_N$ at node 244 being greater than reference voltage 533 may indicate that Vbb 550 is too positive. For control voltage 551 output from OPAMP 534 being zero volts, n-type transistor 301 is switched to a "weakly-on" state. Transistor 301 is "weakly-on" when its gate is coupled to ground because its source is coupled to a negative voltage Vbb. Accordingly, charge pump 520, in response to Vbb 550 becoming more positive, increases frequency of oscillating signals 204 and 205 responsive to a corresponding increase in control voltage 240 as applied to voltage control port 215. In effect, switching n-type transistor 301 to a weakly-on state such that it reduces the overall standby current load by substantially precluding leakage current contribution of n-type transistor 301, n-type transistor 301 is used in charge pump 520 for bringing Vbb 550 more negative.

With continuing reference to FIG. 5, it should be appreciated that transistor 301 in this configuration is digitally controlled by control voltage 551 output from OPAMP 534. Notably, although an OPAMP 534 configured to provide a binary output is described, it should be appreciated that any of a variety of known types of comparator circuits may be used. By having comparator output, namely control voltage 551, go to a logic high level to more quickly turn on transistor 301 and thus more quickly pull Vbb up toward ground, overshoot and settling time of Vbb 550, such as at start up, may be reduced. Notably, transistor 401 of FIG. 4 receives an analog control voltage 240 rather than a digital control voltage 551 as provided to transistor 301 of FIG. 5, Thus, it should be appreciated that transistor 401 of FIG. 4 may be effectively operated in a non-saturation range in contrast to operation of transistor 301 being used in saturation regions.

Figure 6A:
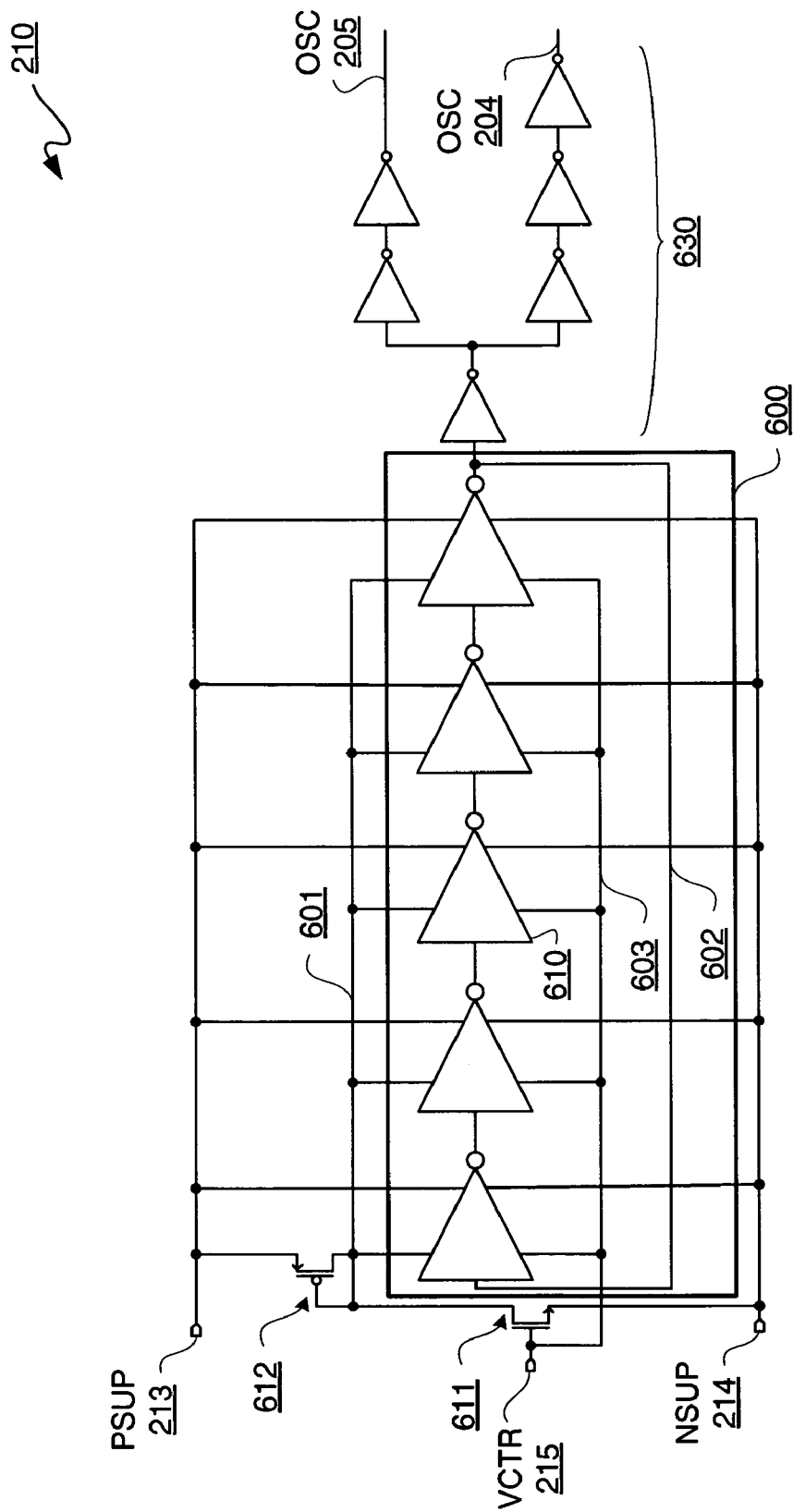
FIGS. 6A and 6B are circuit diagrams depicting two respective alternative exemplary embodiments of a voltage-controlled oscillator.

FIG. 6A is a circuit diagram depicting an exemplary embodiment of VCO 210. VCO 210 includes a ring 600 of five inverters 610. The output 602 of inverters 610 is coupled to buffers 630 for providing respective oscillating signals 204 and 205. Supply ports 213 and 214 are used for powering inverters 610. Voltage control port 215 is coupled to n-gate inputs 603 of inverters 610 as well as to a gate electrode of an n-type transistor 611. An n-type region of n-type transistor 611 is coupled to negative supply port 214.

A p-type transistor 612 has its gate coupled to an n-type region of transistor 611, as well as to p-gate inputs 601 of inverters 610. Furthermore, a p-type region of p-type transistor 612 is coupled to its gate electrode, and another p-type region of p-type transistor 612 is coupled to positive supply port 213. FIG. 6C is a circuit diagram depicting an exemplary embodiment of an inverter 610. It should be appreciated that each of inverters 610 is configured with a pair of p-type and n-type transistors as is known. Each inverter 610 further has another p-type transistor in series and another n-type transistor in series with their associated p-type and n-type counter parts. Input voltage and output voltage of each inverter 610 is generally represented by vin and vout.

Figure 6B:
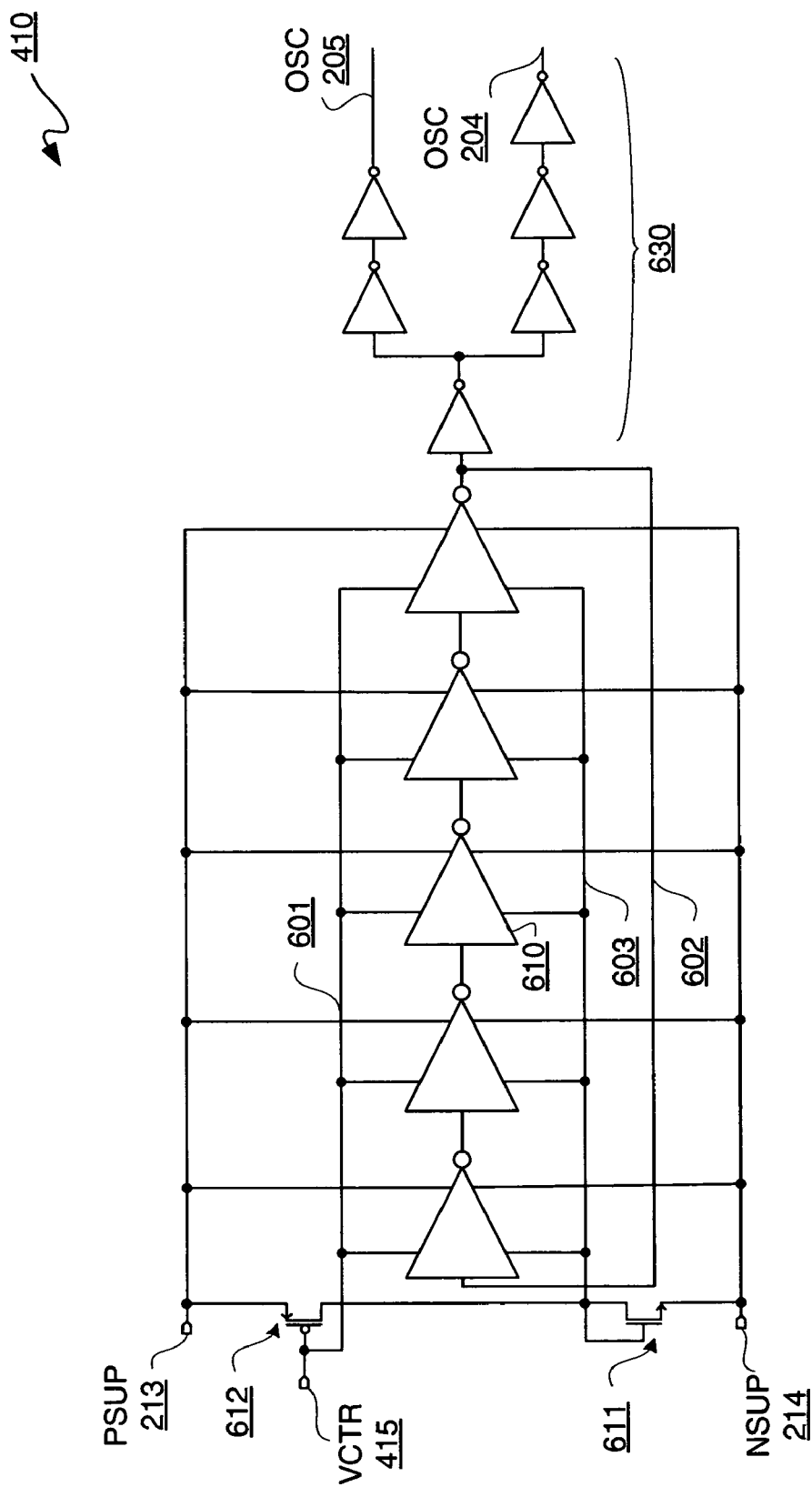

FIG. 6B is a circuit diagram depicting an exemplary embodiment of VCO 410. VCO 410 is substantially similar to VCO 210 of FIG. 6A, and accordingly only the differences are described for purposes of clarity. Rather than voltage control port 215 as in FIG. 6A, a voltage control port 415 of opposite polarity is illustratively shown. Accordingly, voltage control port 415 is coupled to a gate of p-type transistor 612. Gate of p-type transistor 612 is further coupled to p-gate inputs 601 of inverters 610. A p-type region of p-type transistor 612 is coupled to a gate electrode and an n-type region of n-type transistor 611. The gate electrode and associated coupled p-type region of p-type transistor 611 are coupled to n-gate inputs 603 of inverters 610.

FIG. 7 is a block/circuit diagram depicting an exemplary embodiment of a programmable resistive load 700. Programmable resistive load 700 may be used for resistive load R2 of FIG. 2A, as previously described, and may or may not be used for resistive load R1.

Memory cell 731 may be a static random access memory ("SRAM") cell having complementary bitlines. Memory cell 731 for an FPGA may be a configuration SRAM memory cell. Notably, other known types of memory may be used. One bitline of memory cell 731, namely bitline 711, is coupled to a gate electrode of n-type transistor 701. Another bitline of memory cell 731, namely bitline 712, is coupled to the gate electrode of p-type transistor 702. Transistors 701 and 702 are coupled in parallel with resistor 722. Memory cell 731 may be programmed such that resistor 722 may be shorted in one programmed state and is not shorted in an opposite programmed state.

Transistors 701 and 702 are respectively coupled in series with n-type transistors 703 and 704, and resistors 721 through 725 are coupled in series to form a resistor ladder. Node 244 is located between transistors 701 and 703, and thus likewise between transistors 702 and 704. Node 244 is further located between resistors 722 and 723 of the resistor ladder. Resistors 723 and 724 are coupled in series with one another and in three-way parallel with transistors 703 and 704. Memory cell 732 has a bitline, namely bitline 713, coupled to a gate electrode of transistor 703. Complementary bitline 714 of bitline 713 of memory cell 732 is coupled to a gate electrode of p-type transistor 704. Accordingly, by programming memory cell 732, transistors 703 and 704 may or may not short series resistance of resistors 723 and 724. Thus it should be appreciated that any of a variety of resistances for resistive load R2 may be provided by either shorting one or more resistors 722 or series resistance of resistors 723 and 724 as described herein, or not shorting any at all. It should be appreciated that resistive load R1 may be a discrete value, and thus voltage at node 244, which may vary from application to application, may be varied by varying resistive load R2 by programming memory cells 731 and 732. Because Vbb is dependent upon the ratio of R1 to R2, it should be appreciated that R1 may be held fixed and R2 varied in order to set Vbb. In this manner, a target Vbb may be programmed by programming R2 using programmable resistance 700. Furthermore, it should be appreciated that even though two sets of two transistors in parallel are illustratively to shunt each programmable resistance increment associated therewith, it should be appreciated that a single transistor may be used to short an associated resistance increment. Alternatively, resistive loads R1 and R2 may both be programmable.

Figure 8:
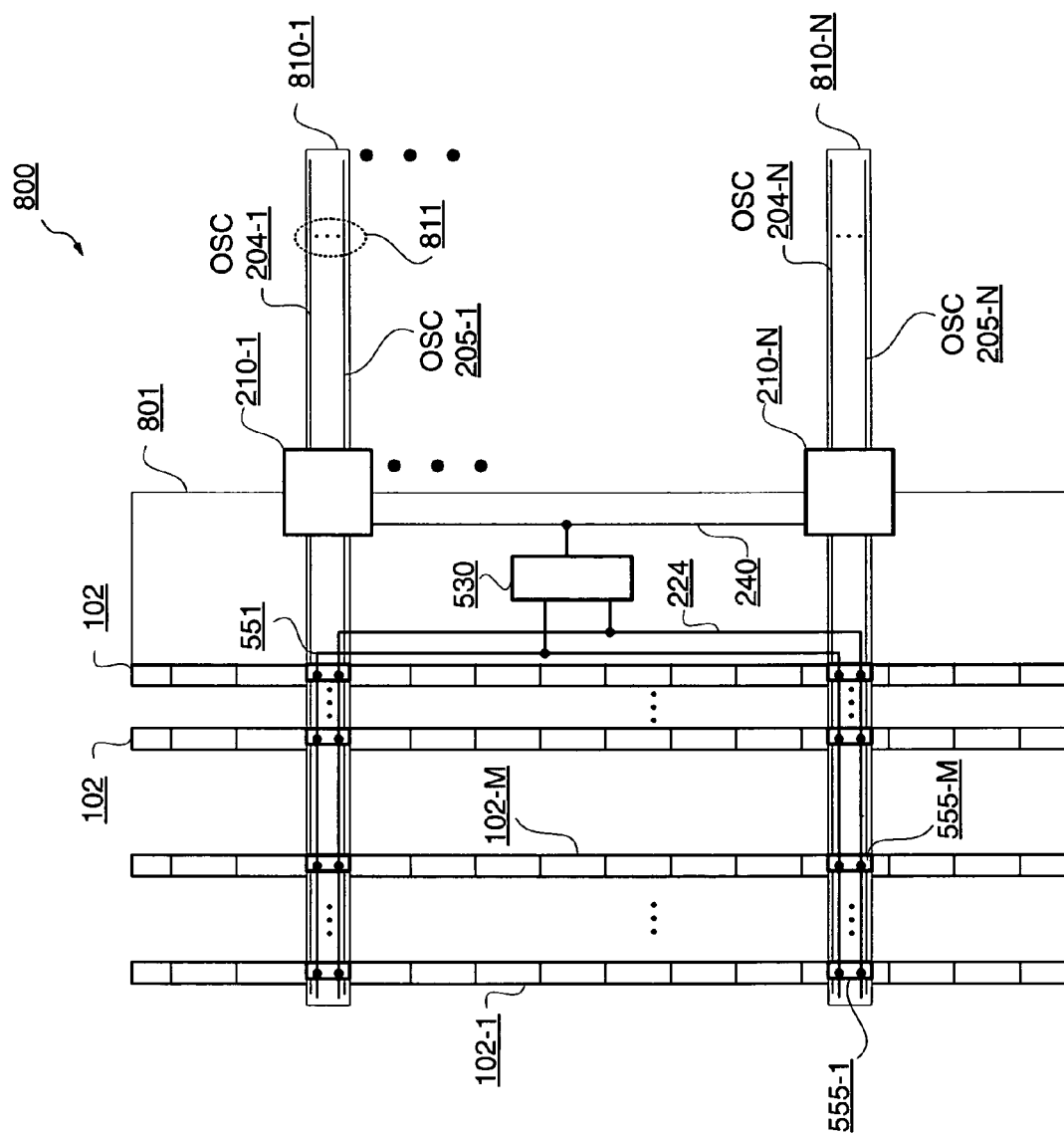
FIG. 8 is a block diagram depicting an exemplary embodiment of a portion of an integrated circuit, such as the FPGA of FIG. 1.

FIG. 8 is a block diagram depicting an exemplary embodiment of a portion of an integrated circuit 800. Integrated circuit 800 may be FPGA 100 of FIG. 1. Assuming integrated circuit 800 is FPGA 100 of FIG. 1, a column 801 at or near the center of the semiconductor die of integrated circuit 800 may have located therein a voltage regulator. For purposes of clarity by way of example, it shall be assumed that voltage generator 500 of FIG. 5 is implemented in integrated circuit 800, however, it should be appreciated that any of the voltage generators described herein may be implemented in an integrated circuit 800. Furthermore, even though a particular configuration described with respect to implementation of voltage generator 500 is described herein, it should be appreciated that variations to such configuration may be used.

With simultaneous reference to FIGS. 5 and 8, integrated circuit 800 is further described. Voltage regulator 530 may be located in column 801. Control voltage 240 from voltage regulator 530 may be provided to VCOs 210-1 through 210-N in respective association with clock rows 810-1 through 810-N for N a positive integer greater than one. Clock rows 810-1 through 810-N may be H clock rows of FPGA 100 of FIG. 1, which are illustratively shown in FIG. 1 as configuration/clock distribution areas 109. Thus, there may be a one-to-one correspondence between VCOs 210 and clock rows 810.

Each clock row 810 may include a plurality of traces 811 for distributing clock signals. Pairs of oscillating signals 204 and 205 may be respectively provided from VCOs 210-1 through 210-N to each charge transfer circuit 555 associated with a corresponding clock row 810. Thus, there will be N oscillating signals 204 ("OCS 204-1" through "OCS 204-N") and N oscillating signals 205 ("OCS 205-1" through "OCS 205-N").

CLB columns 102-1 through 102-M, for M a positive integer greater than one, of a column of CLBs for example may intersect clock rows 810-1 through 810-N. For each CLB column 102-1 through 102-M there may be a corresponding charge transfer circuit 555-1 through 555-M for each clock row 810-1 through 810-N intersecting such CLB columns 102-1 through 102-M. Thus for each CLB column 102 intersecting a clock row 810 there may be a charge transfer circuit 555, which may be disposed in a clock row 810.

All charge transfer circuits 555 may have a common node 224 for providing Vbb to voltage regulator 530. This common node may be obtained by using traces associated with clock rows 810-1 through 810-N. Likewise, traces of clock rows 810-1 through 810-N may be used for providing control voltage 551 from OPAMP 534 to each charge transfer circuit 555.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. An integrated circuit, comprising:
  a voltage generator for generating a negative body bias voltage, the voltage generator including a charge pump and a voltage regulator coupled to the charge pump;
  a plurality of n-type transistors coupled to the charge pump to receive the negative body bias voltage from the voltage generator;
  the charge pump including a voltage-controlled oscillator coupled to a charge transfer circuit;
  the voltage-controlled oscillator including a first output port and a second output port for providing a first oscillating signal and a second oscillating signal respectively therefrom;
  the voltage-controlled oscillator further including a voltage control port;
  the charge transfer circuit including an input voltage node and an output voltage node;
  the output voltage node for sourcing the negative body bias voltage therefrom to provide to a plurality of body regions respectively of the plurality of n-type transistors;
  the charge transfer circuit further including a first charge input node and a second charge input node, and a first capacitive device and a second capacitive device;
  the first charge input node coupled to the first output port of the voltage-controlled oscillator to receive the first oscillating signal therefrom, the first charge input node coupled to the first capacitive device, wherein the first capacitive device receives the first oscillating signal;
  the second charge input node coupled to the second output port of the voltage controlled oscillator to receive the second oscillating signal therefrom, the second charge input node coupled to the second capacitive device, wherein the second capacitive device receives the second oscillating signal;

the first and the second oscillating signal being out of phase with respect to one another;

the charge transfer circuit configured to transfer charge to the output voltage node from the first capacitive device and the second capacitive device responsive to the first oscillating signal and the second oscillating signal, respectively;

the voltage regulator including a voltage divider circuit and an operational amplifier;

the voltage divider circuit coupled to the output voltage node to receive the negative body bias voltage and configured to provide a nodal voltage responsive to the negative body bias voltage as an input to the operational amplifier; and the operational amplifier coupled to receive the nodal voltage and a first reference voltage and configured to provide a control voltage responsive to a difference between the nodal voltage and the first reference voltage, the control voltage being an analog of the difference.

2. The integrated circuit according to claim 1, wherein the voltage controlled oscillator is coupled to receive the control voltage at the voltage control port and configured to adjust amplitude of the first oscillating signal and the second oscillating signal responsive to the control voltage.

3. The integrated circuit according to claim 1, wherein the voltage controlled oscillator is coupled to receive the control voltage at the voltage control port and configured to start and stop the first oscillating signal and the second oscillating signal responsive to the control voltage.

4. The integrated circuit according to claim 1, wherein the charge transfer circuit is coupled to receive the control voltage and configured to vary capacitance of the first capacitive device and the second capacitive device responsive the control voltage.

5. The integrated circuit according to claim 1, wherein the voltage controlled oscillator is coupled to receive the control voltage at the voltage control port and configured to adjust frequency of the first oscillating signal and the second oscillating signal responsive to the control voltage.

6. The integrated circuit according to claim 5, wherein the charge transfer circuit includes a first p-type transistor and a second p-type transistor, a first n-type transistor and a second n-type transistor, and a first interim node and a second interim node;

the first p-type transistor having a first p-type region coupled to the input voltage node and a second p-type region coupled to the first interim node;

the first p-type transistor having a gate electrode coupled to the second interim node;

the first n-type transistor having a first n-type region coupled to the first interim node and a second n-type region coupled to the output voltage node;

the first n-type transistor having a gate electrode coupled to the second interim node;

the second p-type transistor having a third p-type region coupled to the input voltage node and a fourth p-type region coupled to the second interim node;

the second p-type transistor having a gate electrode coupled to the first interim node;

the second n-type transistor having a third n-type region coupled to the second interim node and a fourth n-type region coupled to the output voltage node; and the second n-type transistor having a gate electrode coupled to the first interim node.

7. The integrated circuit according to claim 6, wherein:

the first p-type transistor and the second p-type transistor each have a supply voltage coupled to respective body regions thereof;

the first n-type transistor and the second n-type transistor are included as part of the plurality of n-type transistors such that each of the first n-type transistor and the second n-type transistor has a respective body region included as part of the plurality of body regions coupled to the output voltage node;

the voltage-controlled oscillator includes a positive supply voltage port and a negative supply voltage port respectively coupled to a supply voltage source and a ground; and the input voltage node is coupled to ground.

8. The integrated circuit according to claim 5, further comprising:

an n-type transistor having one n-type region coupled to a ground, another n-type region coupled to the output voltage node, and a gate electrode coupled to receive the control voltage; and the n-type transistor configured to have leakage sufficient to raise a minimum overall leakage current of the plurality of n-type transistors within an order of magnitude of a maximum leakage current of the plurality of n-type transistors.

9. The integrated circuit according to claim 8, wherein the n-type transistor is included within the plurality of n-type transistors such that the n-type transistor has a body region included within the plurality of body regions coupled to the output voltage node.

10. The integrated circuit according to claim 5, further comprising:

an n-type transistor having one n-type region coupled to a ground, another n-type region coupled to the output voltage node, and a gate electrode coupled to the ground;

the n-type transistor configured to have leakage sufficient to raise a minimum leakage current of the plurality of n-type transistors within an order of magnitude of a maximum leakage current of the plurality of n-type transistors; and the n-type transistor is included within the plurality of n-type transistors such that the n-type transistor has a body region included within the plurality of body regions coupled to the output voltage node.

11. The integrated circuit according to claim 1, further comprising:

a comparator coupled to receive the nodal voltage and a second reference voltage and configured to provide a switch voltage which is either a logic high voltage at least responsive to the nodal voltage being less than the second reference voltage or a logic low voltage at least responsive to the nodal voltage being greater than the second reference voltage; and an n-type transistor having one n-type region coupled to a ground, another n-type region coupled to the output voltage node, and a gate electrode coupled to receive the switch voltage from the comparator.

12. The integrated circuit according to claim 11, wherein:

the n-type transistor is configured to have leakage sufficient to raise a minimum leakage current of the plurality of n-type transistors within an order of magnitude of a maximum leakage current of the plurality of n-type transistors; and the n-type transistor is included within the plurality of n-type transistors such that the n-type transistor has a body region included within the plurality of body regions coupled to the output voltage node.

13. The integrated circuit according to claim 1, wherein the voltage divider circuit includes a first resistive load and a second resistive load coupled in series, the first resistive load coupled to a second reference voltage, the second resistive load coupled to the output voltage node, and the nodal voltage sourced from between the first resistive load and the second resistive load.

14. The integrated circuit according to claim 13, wherein:
the second resistive load includes a plurality of discrete resistors coupled in series and a portion of the plurality of discrete resistors shunted with at least one transistor;
the portion of the plurality of discrete resistors is effectively shorted responsive to application of a switching voltage to a gate electrode of the at least one transistor;
the switching voltage is obtained from an output of a configuration memory cell, the configuration memory cell being programmable for programmably selecting resistance of the second resistive load; and
the integrated circuit is a programmable logic device.

15. The integrated circuit according to claim 14, further comprising:
a plurality of charge transfer circuits inclusive of the charge transfer circuit, the plurality of charge transfer circuits having the output voltage node in common;
a plurality of voltage-controlled oscillators inclusive of the voltage-controlled oscillator, the plurality of voltage-controlled oscillators apportioned to respective portions of the plurality of charge transfer circuits;
a single instance of the voltage regulator coupled to the output voltage node common to the plurality of charge transfer circuits for providing the control voltage to each of the plurality of voltage controlled oscillators;
the plurality of n-type transistors associated with columns of configuration logic blocks;
the plurality of voltage-controlled oscillators apportioned responsive to clock rows of the integrated circuit;
each of the clock rows including a plurality of signal lines;
each of the clock rows associated with providing the first oscillating signal and the second oscillating signal of each of the plurality of voltage controlled oscillators respectively apportioned thereto;
number of the portions of the plurality of charge transfer circuits respectively associated with number of the clock rows providing the first oscillating signal and the second oscillating signal; and
the portions of the plurality of charge transfer circuits each having a number of charge transfer circuits thereof equivalent in number to the columns of configurable logic blocks intersecting a clock row of the clock rows associated therewith.

* * * * *